US012000807B2

(12) United States Patent
Komori

(10) Patent No.: US 12,000,807 B2
(45) Date of Patent: Jun. 4, 2024

(54) GAS CHROMATOGRAPH, MAINTENANCE SWITCH MODE SETTING METHOD AND NON-TRANSITORY COMPUTER READABLE MEDIUM STORING MAINTENANCE SWITCH MODE SETTING PROGRAM

(71) Applicant: SHIMADZU CORPORATION, Kyoto (JP)

(72) Inventor: Yuki Komori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 567 days.

(21) Appl. No.: 17/311,935

(22) PCT Filed: Dec. 17, 2018

(86) PCT No.: PCT/JP2018/046430
§ 371 (c)(1),
(2) Date: Jun. 8, 2021

(87) PCT Pub. No.: WO2020/129136
PCT Pub. Date: Jun. 25, 2020

(65) Prior Publication Data
US 2022/0026402 A1     Jan. 27, 2022

(51) Int. Cl.
*G01N 30/06* (2006.01)
*G01N 30/16* (2006.01)
(Continued)

(52) U.S. Cl.
CPC ............. *G01N 30/30* (2013.01); *G01N 30/06* (2013.01); *G01N 30/16* (2013.01); *G01N 2030/025* (2013.01); *G01N 2030/3084* (2013.01)

(58) Field of Classification Search
CPC ........ G01N 30/06; G01N 30/16; G01N 30/30; G01N 2030/025; G01N 2030/126;
(Continued)

(56) References Cited

U.S. PATENT DOCUMENTS

2002/0084222 A1   7/2002   Brann
2004/0055938 A1   3/2004   Brann
(Continued)

FOREIGN PATENT DOCUMENTS

JP      11-014613 A      1/1999
JP      2004-524518 A    8/2004
(Continued)

OTHER PUBLICATIONS

Office Action dated Jul. 26, 2023 in Chinese Application No. 201880100311.1.
(Continued)

*Primary Examiner* — Alexander A Mercado
(74) *Attorney, Agent, or Firm* — Sughrue Mion, PLLC

(57) ABSTRACT

A gas chromatograph includes first and second sample vaporization units, first and second separation columns, first and second carrier gas suppliers, a column oven that contains the first and second separation columns and has a first heater, first and second detectors, a first auxiliary gas supplier that supplies an auxiliary gas to the first separation column and a controller that executes control by increasing a supply pressure of an auxiliary gas applied by the first auxiliary gas supplier to a pressure higher than a pressure during an analysis of a sample and lowering a supply pressure of a carrier gas applied by the first carrier gas supplier to a pressure lower than a pressure during the analysis of the sample such that the supply pressure of the auxiliary gas is higher than the supply pressure of the carrier
(Continued)

gas, and sets a first maintenance switch mode in which the first sample vaporization unit is maintainable.

16 Claims, 7 Drawing Sheets

(51) Int. Cl.
*G01N 30/30* (2006.01)
*G01N 30/02* (2006.01)

(58) Field of Classification Search
CPC ......... G01N 2030/38; G01N 2030/383; G01N 2030/3084
See application file for complete search history.

(56) References Cited

U.S. PATENT DOCUMENTS

| | | |
|---|---|---|
| 2005/0145547 A1 | 7/2005 | Brann |
| 2006/0163133 A1 | 7/2006 | Brann |
| 2007/0248491 A1 | 10/2007 | Brann |
| 2009/0324447 A1 | 12/2009 | Brann |
| 2010/0307227 A1 | 12/2010 | Brann |
| 2011/0308298 A1* | 12/2011 | Magni .................... G01N 30/32 73/23.35 |
| 2012/0125444 A1* | 5/2012 | Tipler .................... G01N 30/40 137/861 |
| 2017/0023534 A1* | 1/2017 | McCauley ............. G01N 30/18 |
| 2019/0094195 A1* | 3/2019 | Gentner ................. G01N 30/08 |
| 2019/0234913 A1 | 8/2019 | Kojima |
| 2020/0166484 A1* | 5/2020 | Masuda ............. G01N 30/7206 |

FOREIGN PATENT DOCUMENTS

| | | |
|---|---|---|
| JP | 2009-092672 A | 4/2009 |
| JP | 2010-203951 A | 9/2010 |
| JP | 3191627 U | 7/2014 |
| JP | 2014134392 A | 7/2014 |
| JP | 2015-52533 A | 3/2015 |
| WO | 2018/047279 A1 | 3/2018 |

OTHER PUBLICATIONS

Notice of Reasons for Refusal dated May 10, 2022 from the Japanese Patent Office in Japanese Application No. 2020-560665.
International Search Report for PCT/JP2018/046430 dated Mar. 3, 2019 [PCT/ISA/210].
Written Opinion for PCT/JP2018/046430 dated Mar. 3, 2019 [PCT/ISA/237].

* cited by examiner

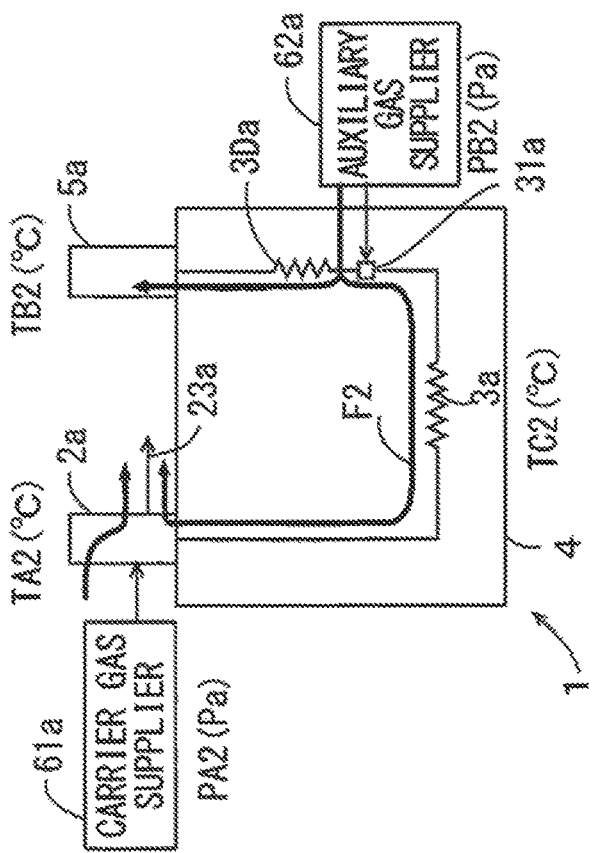
FIG. 3A  DURING AN ANALYSIS
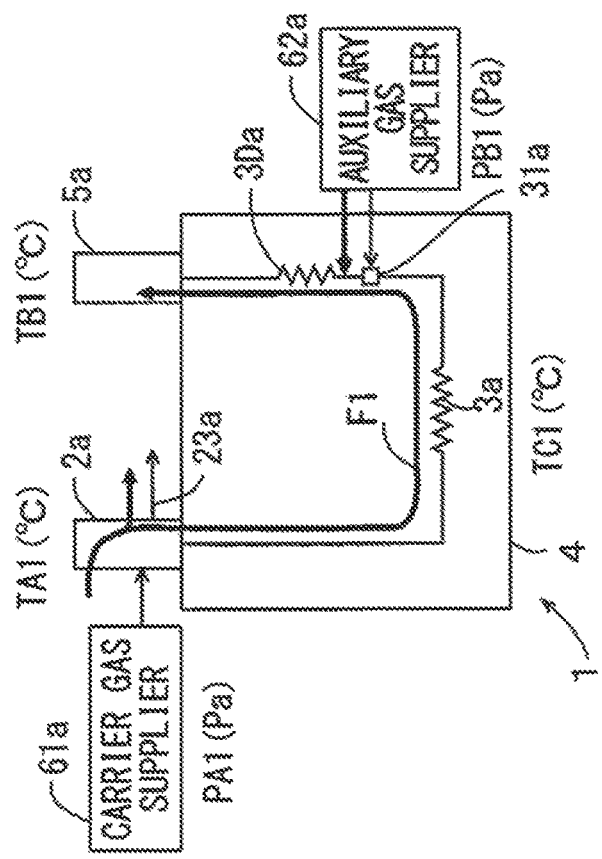
FIG. 3B  MAINTENANCE SWITCH MODE F I G. 6 A
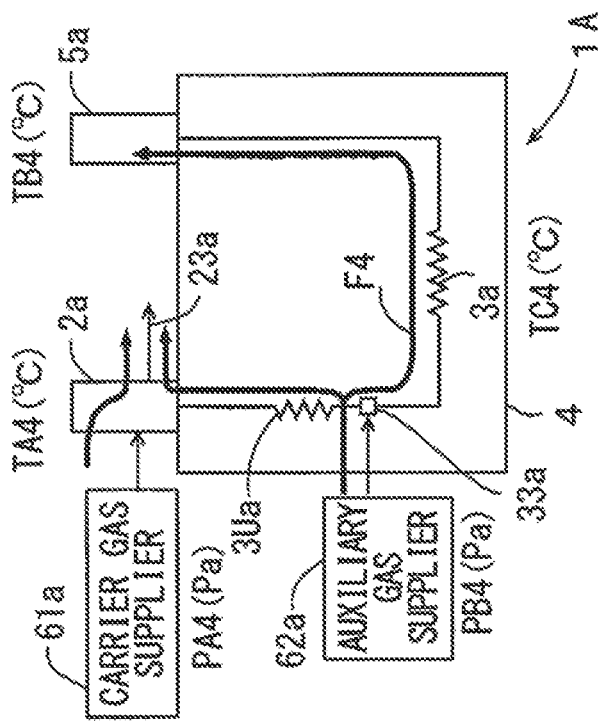
DURING AN ANALYSIS
F I G. 6 B
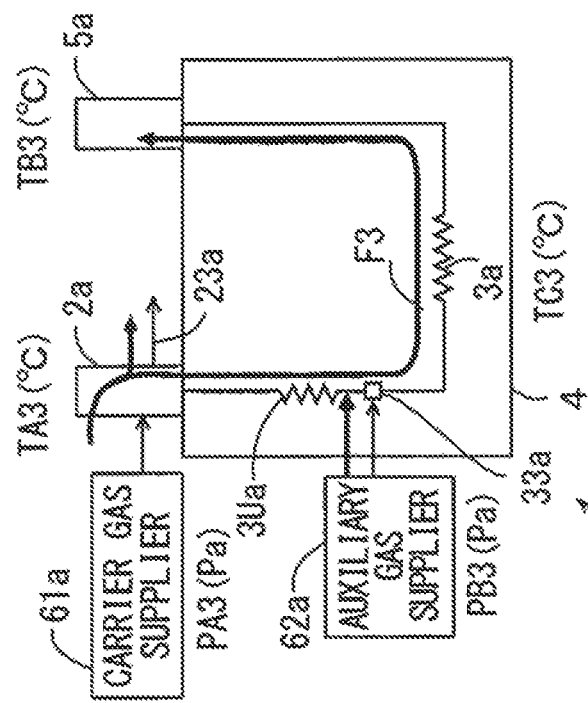
MAINTENANCE SWITCH MODE

GAS CHROMATOGRAPH, MAINTENANCE SWITCH MODE SETTING METHOD AND NON-TRANSITORY COMPUTER READABLE MEDIUM STORING MAINTENANCE SWITCH MODE SETTING PROGRAM

CROSS REFERENCE TO RELATED APPLICATIONS

This application is a National Stage of International Application No. PCT/W2018/046430 filed Dec. 17, 2018.

TECHNICAL FIELD

The present invention relates to a gas chromatograph, a method of setting the gas chromatograph in a maintenance switch mode and a non-transitory computer readable medium storing a program for setting the gas chromatograph in the maintenance switch mode.

BACKGROUND ART

The gas chromatograph includes a carrier gas supplier, a sample vaporization unit (sample vaporization chamber), a separation column, a column oven and a detector (see Patent Document 1, for example). The carrier gas supplier supplies a carrier gas to the sample vaporization unit. The separation column is contained in the column oven. The column oven includes a heater and heats the separation column. When a sample is analyzed, the sample is vaporized in the sample vaporization unit. The sample vaporized in the sample vaporization unit is supplied to the separation column by the carrier gas. The sample supplied to the separation column is separated into respective sample components. Each sample component obtained by separation in the separation column is detected by the detector.

Further, there is a gas chromatograph including a plurality of sample vaporization units. For example, a gas chromatograph including two sample vaporization units includes two separation columns respectively corresponding to the two sample vaporization units. The two separation columns are contained in one common column oven.

The sample vaporization unit includes components such as a glass insert and a septum that need to be maintained regularly. In order to replace components such as the glass insert and the septum, it is necessary to remove a lid of the sample vaporization unit and release an inner gas in the unit. However, during an analysis of a sample in the gas chromatograph, the pressure of gas in the sample vaporization unit is high due to the supply of a carrier gas. Therefore, in order to replace the components to be maintained such as the glass insert and the septum, it is necessary to lower the supply pressure of the carrier gas supplied from the carrier gas supplier and lower the pressure of gas in the sample vaporization unit.

[Patent Document 1] JP 2014-134392 A

SUMMARY OF INVENTION

Technical Problem

As described above, it is necessary to lower the supply pressure of the carrier gas supplied from the carrier gas supplier in order to lower the pressure of gas in the sample vaporization unit when replacing the components to be maintained such as the glass insert and the septum. However, in a case where the concentration of the carrier gas in the separation column is lowered, when the separation column continues to be heated with air in the separation column, the separation column is oxidized. Therefore, in a case where the supply pressure of the carrier gas is lowered for maintenance of the sample vaporization unit, the temperature of the column oven must also be lowered.

As described above, a gas chromatograph might include two sample vaporization units and one common column oven for containing the two separation columns. In this gas chromatograph, in a case where the temperature of the column oven is lowered for maintenance of one sample vaporization unit, heating for both of the separation columns contained in the column oven is stopped. That is, not only the temperature of a separation column connected to the one sample vaporization unit that is to be maintained is lowered but also the temperature of a separation column connected to the other sample vaporization unit is lowered. In this manner, in a case where the one sample vaporization unit is maintained, not only an analysis process executed with the use of the one analysis line using the one sample vaporization unit is stopped but also an analysis process executed with the use of the other analysis line using the other sample vaporization unit is stopped. That is, regardless of having the plurality of analysis lines, the gas chromatograph cannot continue the analysis process because of maintenance for part of the sample vaporization units.

An object of the present invention is to improve continuity of an analysis process in a gas chromatograph including a plurality of sample vaporization units.

Solution to Problem (1) A gas chromatograph according to one aspect of the present invention includes a first sample vaporization unit that vaporizes a sample, a second sample vaporization unit that vaporizes a sample, a first separation column that separates a sample supplied from the first sample vaporization unit into respective sample components, a second separation column that separates a sample supplied from the second sample vaporization unit into respective sample components, a first carrier gas supplier that supplies a carrier gas, for guiding a sample that is vaporized in the first sample vaporization unit to the first separation column, to the first sample vaporization unit, a second carrier gas supplier that supplies a carrier gas, for guiding a sample that is vaporized in the second sample vaporization unit to the second separation column, to the second sample vaporization unit, a column oven that contains the first and second separation columns and has a first heater for heating the first and second separation columns, a first detector that detects respective sample components obtained by separation in the first separation column, a second detector that detects respective sample components obtained by separation in the second separation column, a first auxiliary gas supplier that supplies an auxiliary gas to the first separation column, and a controller that executes control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and sets a first maintenance switch mode in which the first sample vaporization unit is maintainable with the first heater continuing to heat the first and second separation columns and supplies a sample supplied from the second sample vaporization unit to the second separation column as well as setting the first maintenance switch mode to continue an analysis process.

(2) A gas chromatograph according to another aspect of the present invention includes a first sample vaporization unit that vaporizes a sample, a second sample vaporization unit that vaporizes a sample, a first separation column that separates a sample supplied from the first sample vaporization unit into respective sample components, a second separation column that separates a sample supplied from the second sample vaporization unit into respective sample components, a first carrier gas supplier that supplies a carrier gas, for guiding a sample that is vaporized in the first sample vaporization unit to the first separation column, to the first sample vaporization unit, a second carrier gas supplier that supplies a carrier gas, for guiding a sample that is vaporized in the second sample vaporization unit to the second separation column, to the second sample vaporization unit, a column oven that contains the first and second separation columns and has a first heater for heating the first and second separation columns, a detector that detects respective sample components obtained by separation in the first separation column or respective sample components obtained by separation in the second separation column, a first auxiliary gas supplier that supplies an auxiliary gas to the first separation column, and a controller that executes control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and keeps the detector in a state in which a detection process is executable, sets a first maintenance switch mode in which the first sample vaporization unit is maintainable with the first heater continuing to heat the first and second separation columns and supplies a sample supplied from the second sample vaporization unit to the second separation column as well as setting the first maintenance switch mode to continue an analysis process.

Because this gas chromatograph lowers the supply pressure of the carrier gas supplied to the first sample vaporization unit in the first maintenance switch mode, the pressure of gas in the first sample vaporization unit is lowered. Thus, the components in the first sample vaporization unit can be maintained. Further, because the supply pressure of the auxiliary gas is set higher than the supply pressure of the carrier gas by an increase of the supply pressure of the auxiliary gas supplied from the first auxiliary gas supplier, the auxiliary gas flows into the first separation column instead of the carrier gas. Thus, the first maintenance switch mode can be set while the column oven continues to be heated. Because the column oven continues to be heated also in the first maintenance switch mode, the analysis process can be started by the analysis line including the second sample vaporization unit and the second separation column.

(3) The gas chromatograph may further include a second heater for heating the first sample vaporization unit, wherein the controller may control the second heater and lower a temperature of the first sample vaporization unit in the first maintenance switch mode.

Because this gas chromatograph lowers the temperature of the first sample vaporization unit in the maintenance switch mode, the operator can manually maintain the components in the first sample vaporization unit.

(4) The first auxiliary gas supplier may be provided at a position farther downstream than the first separation column.

An auxiliary gas can be supplied to the gas flow path between the first separation column and the first detector, and an auxiliary gas can be supplied to the first separation column in the first maintenance switch mode. Alternatively, an auxiliary gas is supplied into the first detector, and the auxiliary gas can be supplied into the first separation column in the first maintenance switch mode.

(5) The first auxiliary gas supplier may be provided at a position farther upstream than the first separation column.

An auxiliary gas is supplied to the gas flow path between the first separation column and the first sample vaporization unit, and the auxiliary gas can be supplied to the first separation column in the first maintenance switch mode.

(6) The controller may determine necessity of maintenance for the first sample vaporization unit, and may change the gas chromatograph to the first maintenance switch mode in a case where maintenance is necessary.

When it is time for maintenance, the controller automatically changes the gas chromatograph to the first maintenance switch mode. The operator is not required to move to a location at which the gas chromatograph is installed or perform an operation of changing the gas chromatograph to the first main switch mode in order to change the gas chromatograph to the first maintenance switch mode.

(7) The controller may include a notifier that notifies an operator of a change to the first maintenance switch mode when the first maintenance switch mode is set.

The operator can be notified that the gas chromatograph is changed to the first maintenance switch mode. The operator can carry out maintenance work in response to notification by the notifier.

(8) The gas chromatograph described above in (1) may further include a second auxiliary gas supplier that supplies an auxiliary gas to the second separation column, wherein the controller may execute control by increasing a supply pressure of an auxiliary gas applied by the second auxiliary gas supplier to a pressure higher than a pressure during an analysis of a sample supplied from the second sample vaporization unit and lowering a supply pressure of a carrier gas applied by the second carrier gas supplier to a pressure lower than a pressure during the analysis of the sample supplied from the second sample vaporization unit such that the supply pressure of the auxiliary gas is higher than the supply pressure of the carrier gas, and may set a second maintenance switch mode in which the second sample vaporization unit is maintainable with the first heater continuing to heat the first and second separation columns and may supply a sample supplied from the first sample vaporization unit to the first separation column as well as setting the second maintenance switch mode to continue an analysis process.

(9) The gas chromatograph described above in (2) may further include a second auxiliary gas supplier that supplies an auxiliary gas to the second separation column, wherein the controller may execute control by increasing a supply pressure of an auxiliary gas applied by the second auxiliary gas supplier to a pressure higher than a pressure during an analysis of a sample supplied from the second sample vaporization unit and lowering a supply pressure of a carrier gas applied by the second carrier gas supplier to a pressure lower than a pressure during the analysis of the sample supplied from the second sample vaporization unit such that the supply pressure of the auxiliary gas is higher than the supply pressure of the carrier gas, and may keep the detector in a state in which a detection process is executable, may set a second maintenance switch mode in which the second sample vaporization unit is maintainable with the first heater continuing to heat the first and second separation columns and may supply a sample supplied from the first sample vaporization unit to the first separation column as well as setting the second maintenance switch mode to continue an analysis process.

Because this gas chromatograph lowers the supply pressure of the carrier gas supplied to the second sample vaporization unit, the pressure of gas in the second sample vaporization unit is lowered, in the second maintenance switch mode. Thus, the components in the second sample vaporization unit can be maintained. Further, because the supply pressure of the auxiliary gas is set higher than the supply pressure of the carrier gas by an increase of the supply pressure of the auxiliary gas supplied from the second auxiliary gas supplier, the auxiliary gas flows into the second separation column instead of the carrier gas. Thus, the second maintenance switch mode can be set while the column oven continues to be heated. Because the column oven continues to be heated in the second maintenance switch mode, an analysis process can be started by the analysis line including the first sample vaporization unit and the first separation column.

(10) The gas chromatograph may further include a third heater for heating the second sample vaporization unit, wherein the controller may control the third heater and lower a temperature of the second sample vaporization unit in the second maintenance switch mode.

(11) The second auxiliary gas supplier may be provided at a position farther downstream than the second separation column.

(12) The second auxiliary gas supplier may be provided at a position farther upstream than the second separation column.

(13) A maintenance switch mode setting method according to yet another aspect of the present invention for setting a gas chromatograph in a maintenance switch mode, wherein the gas chromatograph includes a first sample vaporization unit that vaporizes a sample, a second sample vaporization unit that vaporizes a sample, a first separation column that separates a sample supplied from the first sample vaporization unit into respective sample components, a second separation column that separates a sample supplied from the second sample vaporization unit into respective sample components, a first carrier gas supplier that supplies a carrier gas, for guiding a sample that is vaporized in the first sample vaporization unit to the first separation column, to the first sample vaporization unit, a second carrier gas supplier that supplies a carrier gas, for guiding a sample that is vaporized in the second sample vaporization unit to the second separation column, to the second sample vaporization unit, a column oven that contains the first and second separation columns and has a first heater for heating the first and second separation columns, a first detector that detects respective sample components obtained by separation in the first separation column, a second detector that detects respective sample components obtained by separation in the second separation column, and a first auxiliary gas supplier that supplies an auxiliary gas to the first separation column, and the maintenance switch mode setting method includes executing control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and setting the gas chromatograph in a state in which the first sample vaporization unit is maintainable with the first heater continuing to heat the first and second separation columns and supplying a sample supplied from the second sample vaporization unit to the second separation column to start an analysis process.

(14) A maintenance switch mode setting method according to yet another aspect of the present invention for setting a gas chromatograph in a maintenance switch mode, wherein the gas chromatograph includes a first sample vaporization unit that vaporizes a sample, a second sample vaporization unit that vaporizes a sample, a first separation column that separates a sample supplied from the first sample vaporization unit into respective sample components, a second separation column that separates a sample supplied from the second sample vaporization unit into respective sample components, a first carrier gas supplier that supplies a carrier gas, for guiding a sample that is vaporized in the first sample vaporization unit to the first separation column, to the first sample vaporization unit, a second carrier gas supplier that supplies a carrier gas, for guiding a sample that is vaporized in the second sample vaporization unit to the second separation column, to the second sample vaporization unit, a column oven that contains the first and second separation columns and has a first heater for heating the first and second separation columns, a detector that detects respective sample components obtained by separation in the first separation column or respective sample components obtained by separation in the second separation column and a first auxiliary gas supplier that supplies an auxiliary gas to the first separation column, and the maintenance switch mode setting method includes executing control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and keeping the detector in a state in which a detection process is executable, setting the gas chromatograph in a state in which the first sample vaporization unit is maintainable with the first heater continuing to heat the first and second separation columns and supplying a sample supplied from the second sample vaporization unit to the second separation column to start an analysis process.

(15) A non-transitory computer readable medium storing a maintenance switch mode setting program according to yet another aspect of the present invention for setting a gas chromatograph in a maintenance switch mode, wherein the gas chromatograph includes a first sample vaporization unit that vaporizes a sample, a second sample vaporization unit that vaporizes a sample, a first separation column that separates a sample supplied from the first sample vaporization unit into respective sample components, a second separation column that separates a sample supplied from the second sample vaporization unit into respective sample components, a first carrier gas supplier that supplies a carrier gas, for guiding a sample that is vaporized in the first sample vaporization unit to the first separation column, to the first sample vaporization unit, a second carrier gas supplier that supplies a carrier gas, for guiding a sample that is vaporized in the second sample vaporization unit to the second separation column, to the second sample vaporization unit, a column oven that contains the first and second separation columns and has a first heater for heating the first and second separation columns, a first detector that detects respective sample components obtained by separation in the first separation column, a second detector that detects respective sample components obtained by separation in the second separation column, and a first auxiliary gas supplier that supplies an auxiliary gas to the first separation column, and the maintenance switch mode setting program causes a computer to execute control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and set the gas chromatograph in a state in which the first sample vaporization unit is maintainable with the first heater continuing to heat the first and second separation columns and supply a sample supplied from the second sample vaporization unit to the second separation column to start an analysis process.

(16) A non-transitory computer readable medium storing a maintenance switch mode setting program according to yet another aspect of the present invention for setting a gas chromatograph in a maintenance switch mode, wherein the gas chromatograph includes a first sample vaporization unit that vaporizes a sample, a second sample vaporization unit that vaporizes a sample, a first separation column that separates a sample supplied from the first sample vaporization unit into respective sample components, a second separation column that separates a sample supplied from the second sample vaporization unit into respective sample components, a first carrier gas supplier that supplies a carrier gas, for guiding a sample that is vaporized in the first sample vaporization unit to the first separation column, to the first sample vaporization unit, a second carrier gas supplier that supplies a carrier gas, for guiding a sample that is vaporized in the second sample vaporization unit to the second separation column, to the second sample vaporization unit, a column oven that contains the first and second separation columns and has a first heater for heating the first and second separation columns, a detector that detects respective sample components obtained by separation in the first separation column or respective sample components obtained by separation in the second separation column, and a first auxiliary gas supplier that supplies an auxiliary gas to the first separation column, and the maintenance switch mode setting program causes a computer to execute control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and keep the detector in a state in which a detection process is executable, set the gas chromatograph in a state in which the first sample vaporization unit is maintainable with the first heater continuing to heat the first and second separation columns and supply a sample supplied from the second sample vaporization unit to the second separation column to start an analysis process.

Advantageous Effects of Invention

The present invention can improve continuity of an analysis process in a gas chromatograph including a plurality of sample vaporization units.

BRIEF DESCRIPTION OF THE DRAWINGS

FIGS. 3A and 3B are diagrams showing the states of the gas chromatograph according to the first embodiment during an analysis and in a maintenance switch mode.

FIGS. 6A and 6B are diagrams showing the states of the gas chromatograph according to the second embodiment during an analysis and in a maintenance switch mode.

DESCRIPTION OF EMBODIMENTS

A gas chromatograph according to embodiments of the present invention will be described below in detail with reference to the drawings.

[1] First Embodiment (1) Overall Configuration of Gas Chromatograph

Figure 1:
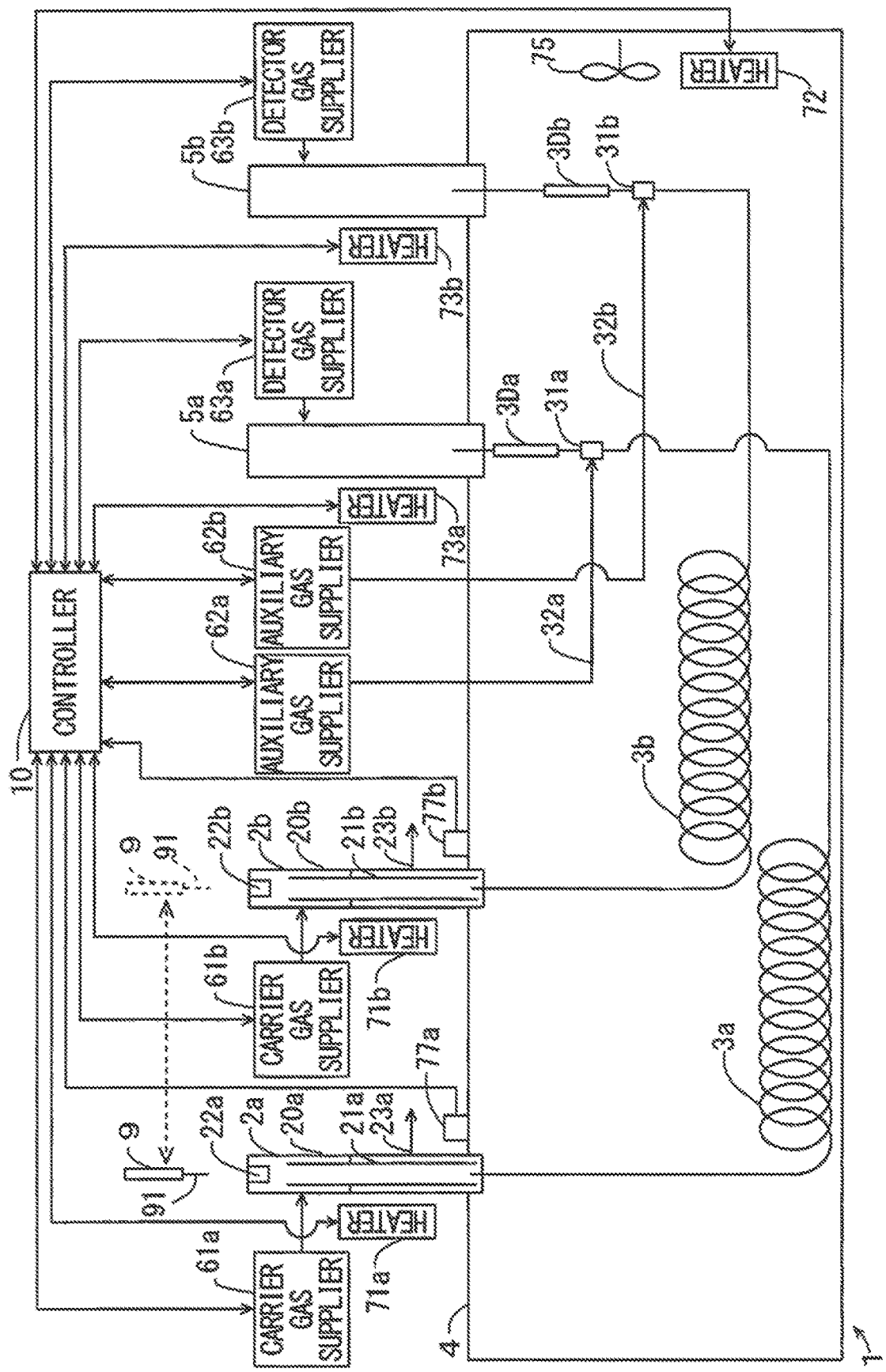
FIG. 1 is an overview showing a gas chromatograph according to a first embodiment.

FIG. 1 is an overview showing a gas chromatograph 1 according to a first embodiment. The gas chromatograph 1 includes an analysis line having two systems that include a first analysis line and a second analysis line. As shown in FIG. 1, the gas chromatograph 1 includes sample vaporization units 2a, 2b, separation columns 3a, 3b, a column oven 4 and detectors 5a, 5b. The first analysis line is constituted by the sample vaporization unit 2a, the separation column 3a, the detector 5a and so on. The second analysis line is constituted by the sample vaporization unit 2b, the separation column 3b, the detector 5b and so on. The first analysis line and the second analysis line share the column oven 4.

Each of the sample vaporization unit 2a, 2b is a device that vaporizes a sample to be analyzed. The sample vaporization units 2a, 2b include metallic casings 20a, 20b, respectively. Glass inserts 21a, 21b that are cylindrical and made of glass are contained in the casings 20a, 20b, respectively. Septums 22a, 22b made of silicone rubber are arranged above the glass inserts 21a, 21b, respectively. The septums 22a, 22b are pierced with a needle 91 of a microsyringe 9, so that a sample contained in the microsyringe 9 drops into the casings 20a, 20b. The microsyringe 9 is controlled by an autosampler (not shown), for example, is movable between the sample vaporization units 2a, 2b and supplies a sample to either one of the sample vaporization units 2a, 2b.

Carrier gas suppliers 61a, 61b supply a carrier gas to the sample vaporization units 2a, 2b, respectively. An inert gas such as helium, nitrogen, argon or the like is used as a carrier gas. Alternatively, a hydrogen gas is used as a carrier gas. Each of the sample vaporization units 2a, 2b includes a carrier gas supply port through which a carrier gas is supplied. Each of the sample vaporization units 2a, 2b further includes a split port through which a carrier gas is exhausted. Split paths 23a, 23b are connected to the split ports, respectively. Column connection portions are provided at the bottom surfaces of the sample vaporization units 2a, 2b, respectively. The upstream ends of the separation columns 3a, 3b are connected in the column connection portions, respectively. Heaters 71a, 71b are arranged in the vicinity of the sample vaporization units 2a, 2b, respectively. Each of the sample vaporization units 2a, 2b is heated by each of the heaters 71a, 71b, so that a sample injected into each of the sample vaporization units 2a, 2b from the microsyringe 9 is vaporized.

The separation columns 3a, 3b are contained in the one common column oven 4. Each of the upstream ends of the separation columns 3a, 3b is connected to each of the sample vaporization units 2a, 2b in each of the column connection portions at the bottom surface of each of the sample vaporization units 2a, 2b. Auxiliary resistor tubes 3Da, 3Db are connected to the downstream ends of the separation columns 3a, 3b, respectively. The downstream ends of the auxiliary resistor tubes 3Da, 3Db are connected to the detectors 5a, 5b, respectively. A heater 72 and a fan 75 are provided in the column oven 4. The separation columns 3a, 3b in the column oven 4 are heated by the heater 7. Air in the column oven 4 is agitated by the fan 75, so that the temperature in the column oven 4 is kept uniform.

Branch elements 31a, 31b are provided between the separation column 3a and the auxiliary resistor tube 3Da and between the separation column 3b and the auxiliary resistor tube 3Db, respectively. An auxiliary gas supplied from each of auxiliary gas suppliers 62a, 62b is supplied to each of the branch elements 31a, 31b through each of auxiliary gas paths 32a, 32b. An auxiliary gas supplied to the branch element 31a flows into the separation column 3a and the auxiliary resistor tube 3Da in accordance with a ratio of channel resistance between the separation column 3a and the auxiliary resistor tube 3Da. An auxiliary gas supplied to the branch element 31b flows into the separation column 3b and the auxiliary resistor tube 3Db in accordance with a ratio of channel resistance between the separation column 3b and the auxiliary resistor tube 3Db. Gas that is used for detection of sample components in the detectors 5a, 5b is utilized as an auxiliary gas. A same type of gas as a carrier gas may be used as an auxiliary gas.

Indicators 77a, 77b are attached to a casing of the column oven 4. The indicator 77a is provided sidewardly of the sample vaporization unit 2a and is a device that notifies an operator that the sample vaporization unit 2a can be maintained. The indicator 77b is provided sidewardly of the sample vaporization unit 2b and is a device that notifies the operator that the sample vaporization unit 2b can be maintained. LEDs are utilized as the indicators 77a, 77b, for example. The indicators 77a, 77b may be attached to the sample vaporization units 2a, 2b, respectively.

The detectors 5a, 5b detect each sample component obtained by separation in the separation columns 3a, 3b, respectively. The detectors 5a, 5b in the present embodiment are FIDs (Flame Ionization Detectors). However, the detectors 5a, 5b that can be utilized in the present embodiment are not limited to FIDs. In addition, a TCD (Thermal Conductivity Detector), an ECD (Electron Capture Detector), an FPD (Flame Photometric Detector), an FTD (Flame Thermionic Detector), a BID (Dielectric-Barrier Discharge Ionization Detector), an MS (Mass Spectrometer), etc. are used as the detectors 5a, 5b. The detector 5a and the detector 5b may be different types of detectors.

Detector gas suppliers 63a, 63d supply gas required for detection of sample components to the detectors 5a, 5b, respectively, as a detector gas. In the present embodiment, FIDs are utilized as the detectors 5a, 5b, so that air and a hydrogen gas are supplied as detector gases. Further, a makeup gas is supplied as necessary as a detector gas.

(2) Configuration of Controller

Figure 2:
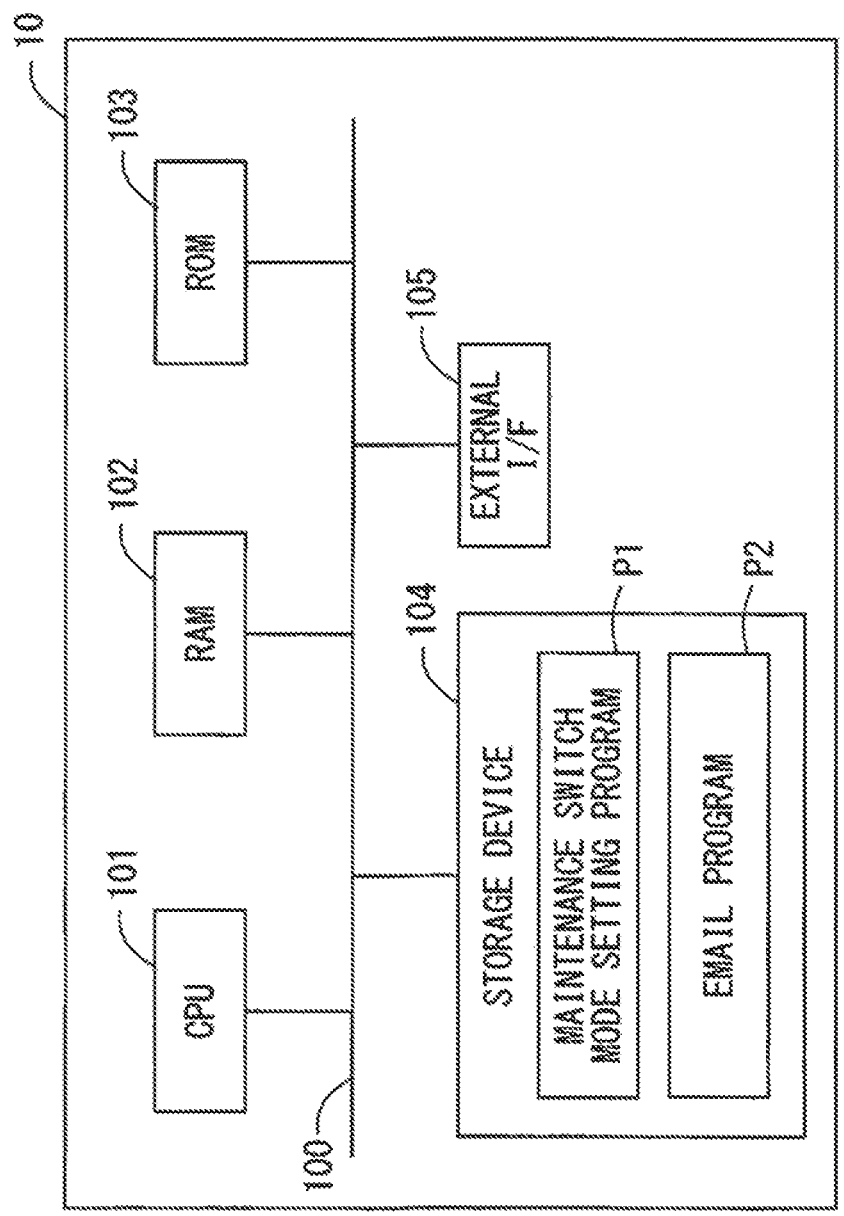
FIG. 2 is a block diagram of a controller included in the gas chromatograph.

FIG. 2 is a block diagram showing the configuration of a controller 10. The controller 10 further includes a CPU (Central Processing Unit) 101, a RAM (Random Access Memory) 102, a ROM (Read Only Memory) 102, a storage device 104 and an external I/F (Interface) 105. The CPU 101, the RAM 102, the ROM 103, the storage device 104 and the external I/F 105 are connected to a bus 100. An external apparatus such as an external storage device may be connected to the bus 100 through the external I/F 105.

The storage device 104 includes a storage medium such as a hard disc, an optical disc, a magnetic disc or a memory card. This storage device 104 stores computer programs such as a maintenance switch mode setting program P1 and an email program P2.

The RAM 102 is made of a volatile memory, for example, and is used as a work area for the CPU 101 and stores various data temporarily. The ROM 103 is made of a non-volatile memory, for example, and stores a control program. The ROM 103 may store a computer program such as the maintenance switch mode setting program P1. The CPU 101 performs a method of setting a maintenance switch mode, described below, by executing the maintenance switch mode setting program P1 and the email program P2 stored in the storage device 104 or the ROM 103.

The maintenance switch mode setting program P1 may be provided in the form of being stored in a computer readable recording medium and installed in the storage device 104 or the ROM 103. Further, the maintenance switch mode setting program P1 may be stored in an external storage device. Further, in a case where the external I/F 105 is connected to a communication network, the maintenance switch mode setting program P1 that is delivered from a server connected to the communication network may be installed in the storage device 104 or the ROM 103.

The carrier gas suppliers 61a, 61b, the auxiliary gas suppliers 62a, 62b and the detector gas suppliers 63a, 63b, described above, are connected to the controller 10 via the external I/F 105. The controller 10 controls the pressure of a carrier gas supplied from each of the carrier gas suppliers 61a, 61b to each of the sample vaporization units 2a, 2b. Thus, the pressure in each of the sample vaporization units 2a, 2b is controlled. The controller 10 controls the pressure of an auxiliary gas supplied from each of the auxiliary gas suppliers 62a, 62b to each of the branch elements 31a, 31b. The controller 10 controls the pressure of a detector gas supplied from each of the detector gas suppliers 63a, 63b to each of the detectors 5a, 5b.

Further, the heaters 71a, 71b, 72, 73a, 73b are also connected to the controller 10 via the external I/F 105. The controller 10 controls the temperature of each of the sample vaporization units 2a, 2b heated by each of the heaters 71a, 71b. The controller 10 controls the temperature of the column oven 4 heated by the heater 72. The controller 10 controls the temperature of each of the detectors 5a, 5b heated by each of the heaters 73a, 73b.

(3) Behavior in Analysis Process

As described above, the gas chromatograph 1 has the first analysis line including the sample vaporization unit 2a, the separation column 3a and so on and the second analysis line including the sample vaporization unit 2b, the separation column 3b and so on. The gas chromatograph 1 utilizes either one of the first analysis line and the second analysis line to execute an analysis process. Behavior in an analysis process using the first analysis line out of the two analysis systems will be described below, by way of example. The behavior in an analysis process using the second analysis line is similar to the analysis process using the first analysis line.

As preparation for an analysis process, the sample vaporization unit 2a, the column oven 4 and the detector 5a are set to a state where the analysis process can be executed. Specifically, with control of the controller 10, the carrier gas supplier 61a supplies a carrier gas to the sample vaporization unit 2a. The carrier gas supplied from the carrier gas supplier 61a to the sample vaporization unit 2a is supplied to the separation column 3a. Part of the carrier gas supplied from the carrier gas supplier 61a to the sample vaporization unit 2a is exhausted from the split path 23a. Further, with control of the controller 10, the auxiliary gas supplier 62a supplies an auxiliary gas.

For example, the controller 10 supplies a carrier gas to the sample vaporization unit 2a at the pressure of 100 kPa. Further, the controller 10 supplies an auxiliary gas to the branch element 31a at the pressure of 30 kPa. In this manner, the pressure of a carrier gas is set higher than the pressure of an auxiliary gas during an analysis process. The auxiliary gas supplied from the auxiliary gas supplier 62a flows into the separation column 3a and the auxiliary resistor tube 3Da in accordance with a ratio of channel resistance between the separation column 3a and the auxiliary resistor tube 3Da. However, the pressure of the carrier gas is higher than the pressure of the auxiliary gas during an analysis, so that the auxiliary gas supplied from the auxiliary gas supplier 62a flows toward the auxiliary resistor tube 3Da due to the pressure of the carrier gas.

Further, as preparation for an analysis process, the heater 71a is controlled, and the casing 20a and the glass insert 21a of the sample vaporization unit 2a are heated, with control of the controller 10. With control of the controller 10, the heater 72 and the fan 75 are controlled, and the column oven 4 is heated. Because air in the separation column 3a is replaced with a carrier gas in the pre-step, the separation column 3a can be heated. A carrier gas is supplied also from the carrier gas supplier 61b of the second analysis line to the separation column 3b. Therefore, gas is supplied to both of the separation columns 3a, 3b, and the column oven 4 can carry out heating. Further, with control of the controller 10, the heater 73a is controlled, and the detector 5a is heated. Then, the detector 5a is put in a state where an analysis process can be executed with control of the controller 10.

The controller 10 controls the heater 71a and sets the temperature of the sample vaporization unit 2a to 300° C., for example. The controller 10 controls the heater 72 and sets the temperature of the column 4 to 250° C., for example. The controller 10 controls the heater 73a and sets the temperature of the detector 5a to 350° C., for example. These temperatures are examples. The controller 10 controls and make the temperatures of the sample vaporization unit 2a, the column oven 4 and the detector 5a be appropriate for execution of an analysis process.

With the above-mentioned preparation for an analysis process completed, a sample drops into the sample vaporization unit 2a from the microsyringe 9. The sample vaporized in the sample vaporization unit 2a is supplied to the separation column 3a due to the pressure of a carrier gas. Part of the vaporized sample is discharged from the split path 23a. Each sample component obtained by separation in the separation column 3a is supplied to the detector 5a through the auxiliary resistor tube 3Da. An auxiliary gas supplied from the auxiliary gas supplier 62a joins a carrier gas in the branch element 31a. As described above, during an analysis process, because the pressure of a carrier gas is set larger than the pressure of an auxiliary gas, most of the supplied auxiliary gas flows toward the downstream detector 5a together with the carrier gas.

A detector gas is supplied to the detector 5a by the detector gas supplier 63a. The detector 5a detects each sample component supplied from the separation column 3a by utilizing the detector gas.

(4) Maintenance Switch Mode

As described above, the sample vaporization units 2a, 2b include the glass inserts 21a, 21b and the septums 22a, 22b, respectively. Components such as the glass inserts 21a, 21b and the septums 22a, 22b are components that need to be maintained regularly. Each of the glass inserts 21a, 21b and the septums 22a, 22b needs to be maintained such as being cleaned or replaced with a new component in accordance with the use count. The gas chromatograph 1 of the present embodiment has a maintenance switch mode, described below. During a period in which the gas chromatograph 1 is changed to the maintenance switch mode, each component to be maintained is removed, replaced, etc. Further, during a period in which the gas chromatograph 1 is changed to the maintenance switch mode, the analysis lines having the two systems are switched.

Next, the states of the gas chromatograph 1 during an analysis and in the maintenance switch mode in a case where the sample vaporization unit 2a of the first analysis line needs to be maintained will be described, by way of example. The same applies to a case where the sample vaporization unit 2b of the second analysis line needs to be maintained.

FIGS. 3A and 3B are diagrams showing a comparison between the states of the gas chromatograph 1 during an analysis and in the maintenance switch mode. In FIGS. 3A and 3B, only the first analysis line is shown, and the second analysis line is not shown. FIG. 3A(a) shows the state of the gas chromatograph 1 during an analysis. FIG. 3B(b) shows the state of the gas chromatograph 1 in the maintenance switch mode.

As shown in FIG. 3A, the supply pressure of a carrier gas applied by the carrier gas supplier 61a is PA1 (Pa) during an analysis. The supply pressure of an auxiliary gas applied by the auxiliary gas supplier 62a is PB1 (Pa). As described above, the controller 10 sets the supply pressure of the carrier gas higher than the supply pressure of the auxiliary gas during the analysis process (PA1>PB1). For example, the controller 10 sets the supply pressure PA1 of the carrier gas to 100 kPa and sets the supply pressure PB1 of the auxiliary gas to 30 kPa.

The arrow F1 in FIG. 3A indicates the direction in which gas flows. The carrier gas supplied from the carrier gas supplier 61a flows from the sample vaporization unit 2a toward the separation column 3a. The carrier gas that flows toward the separation column 3a further flows downstream and is sent into the detector 5a. Part of the carrier gas supplied from the carrier gas supplier 61a is exhausted from the split path 23a. The auxiliary gas supplied from the auxiliary gas supplier 62a is sent into the detector 5a together with the carrier gas due to the pressure of the carrier gas.

As shown in FIG. 3A, during the analysis, the temperature of the sample vaporization unit 2a is set to TA1 (° C.), the temperature of the detector 5a is set to TB1 (° C.) and the temperature of the column oven 4 is set to TC1 (° C.). The controller 10 sets the temperature of the sample vaporization unit 2a to 300° C., sets the temperature of the detector 5a to 350° C. and sets the temperature of the column oven 4 to 250° C., for example. In the above-mentioned states, the gas chromatograph 1 separates a sample supplied from the sample vaporization unit 2a in the separation column 3a, and the detector 5a detects each sample component obtained by separation in the separation column 3a.

As shown in FIG. 3B, the supply pressure of a carrier gas applied by the carrier gas supplier 61a is PA2 (Pa) in the maintenance switch mode. The controller 10 lowers the supply pressure PA2 of the carrier gas to a pressure lower than the supply pressure PA1 during the analysis (PA1>PA2). The supply pressure of an auxiliary gas applied by the auxiliary gas supplier 62a is PB2 (Pa). The controller 10 increases the supply pressure PB2 of the auxiliary gas to a pressure higher than the supply pressure PB1 during the analysis (PB1<PB2). For example, the controller 10 sets the supply pressure PA of the carrier gas to 0 kPa to 30 kPa and sets the supply pressure PB2 of the auxiliary gas to 100 kPa. In this manner, in the maintenance switch mode, the controller 10 sets the supply pressure PB2 of the auxiliary gas to a pressure higher than the supply pressure PA2 of the carrier gas (PA2<PB2). While the supply pressure of the carrier gas is set to 0 kPa to 30 kPa in the above-mentioned example, the present invention is not limited to this. The pressure may be lowered to a degree to which the components of the sample vaporization unit 2a can be maintained. While the supply pressure PB2 of the auxiliary gas is set to 100 kPa in the above-mentioned example, the present invention is not limited to this. The pressure may be increased to a degree to which air does not enter the separation column 3a.

The arrow F2 in FIG. 3B indicates the direction in which gas flows. The carrier gas supplied from the carrier gas supplier 61a is exhausted from the split path 23a. The auxiliary gas supplied from the auxiliary gas supplier 62a flows into the separation column 3a and the auxiliary resistor tube 3Da in accordance with a ratio of channel resistance between the separation column 3a and the auxiliary resistor tube 3Da. The auxiliary gas that flows into the separation column 3a further flows upstream and is exhausted from the split path 23a of the sample vaporization unit 2a. Part of the auxiliary gas supplied from the auxiliary gas supplier 62a is sent into the detector 5a through the auxiliary resistor tube 3Da.

As shown in FIG. 3B, in the maintenance switch mode, the temperature of the sample vaporization unit 2a is set to TA2 (° C.), the temperature of the detector 5a is set to TB2 (° C.) and the temperature of the column oven 4 is set to TC2 (° C.). In the maintenance switch mode, the controller 10 controls the heater 71a and lowers the temperature of the sample vaporization unit 2a (TA1>TA2). The controller 10 sets the temperature of the sample vaporization unit 2a to 50° C., for example. However, this temperature is one example. The controller 10 may lower the temperature of the sample vaporization unit 2a to a degree to which the operator can manually carry out maintenance work.

The controller 10 keeps the temperatures of the detector 5a and the column oven 4 at the same temperatures as the temperatures during the analysis (TB1=TB2, TC1=TC2). That is, in the above-mentioned example, the temperature of the detector 5a is kept at 350° C., and the temperature of the column oven 4 is kept at 250° C. However, theses temperatures are examples. The controller 10 may keep the temperature of the detector 5a at the same temperature as the temperature during the analysis or may lower the temperature of the detector 5 to a temperature slightly lower than the temperature during the analysis. Since the switch to the second analysis line is carried out in the gas chromatograph 1, the controller 10 keeps the temperature of the column oven 4 at the temperature required for an analysis process in the second analysis line. The heater 72 continues to heat the column oven 4, whereby the gas chromatograph 1 can continue the analysis process utilizing the second analysis line even after being changed to the maintenance switch mode. In the above-mentioned state, the gas chromatograph 1 is changed to the maintenance switch mode.

When the gas chromatograph 1 is changed to the maintenance switch mode, the controller 10 notifies the operator that the gas chromatograph 1 has been changed to the maintenance switch mode. The controller 10 causes a touch panel or a liquid crystal screen (not shown) provided in the main body of the gas chromatograph 1, or a computer (a personal computer or the like) connected to the gas chromatograph 1 to display a message and notifies the operator that the gas chromatograph 1 has been changed to the maintenance switch mode. Alternatively, the controller 10 may execute the email program P2 to send an email notifying the operator of the maintenance switch mode. Alternatively, the controller 10 may cause the indicator 77a located sidewardly of the sample vaporization unit 2a provided at the casing of the gas chromatograph 1 to blink and notify the operator that the gas chromatograph 1 has been changed to the maintenance switch mode.

The controller 10 notifies the operator that the gas chromatograph 1 has been changed to the maintenance switch mode and starts the analysis process using the second analysis line. The controller 10 controls the carrier gas supplier 61b and increases the supply pressure of the carrier gas supplied to the sample vaporization unit 2b. For example, the controller 10 sets the supply pressure of the carrier gas supplied to the sample vaporization unit 2b to 100 kPa. The supply pressure of the carrier gas supplied to the sample vaporization unit 2b of the second analysis line is lowered during an analysis process using the first analysis line. However, since heating by the column oven is being carried out, the supply pressure of the carrier gas is adjusted such that air does not enter the separation column 3b. A required amount of gas may be supplied into the separation column 3b while the supply pressure applied by the carrier gas supplier 61b is lowered by closing of a valve in the split path 23b.

In order to start the analysis process using the second analysis line, the controller 10 further sets the supply pressure of the auxiliary gas applied by the auxiliary gas supplier 62b lower than the supply pressure of the carrier gas. For example, the controller 10 sets the supply pressure of the auxiliary gas to 30 kPa.

Further, in order to start the analysis process using the second analysis line, the controller 10 controls the heater 71b and continues to heat the sample vaporization unit 2b. For example, the controller 10 keeps the temperature of the sample vaporization unit 2b at 300° C. The controller 10 keeps the temperature of the sample vaporization unit 2b at a temperature at which the analysis process can be executed also during the analysis process using the first analysis line. Therefore, in the maintenance switch mode, when the analysis process using the second analysis line is started, a waiting time required for the temperature of the sample vaporization unit 2b to increase is not required.

In order to start the analysis process using the second analysis line, the controller 10 further controls the heater 73b and continues to heat the detector 5b. For example, the controller 10 keeps the temperature of the detector 5b at 350° C. The controller 10 keeps the temperature of the detector 5b at a temperature at which the analysis process can be executed also during the analysis process using the first analysis line. Therefore, in the maintenance switch mode, when the analysis process using the second analysis line is started, a waiting time required for the temperature of the detector 5b to increase is not required. Further, a waiting time required for the behavior of the detector 5b to stabilize is not required.

In this manner, when being changed to the maintenance switch mode, the controller 10 adjusts the supply pressures of the carrier gas and the auxiliary gas in the second analysis line to the supply pressures at which the analysis process can be executed. Further, the sample vaporization unit 2b and the detector 5b are kept at temperatures at which the analysis process can be executed also during the analysis process using the first analysis line. Therefore, the temperatures of the sample vaporization unit 2b and the detector 5b are adjusted to the temperatures suitable for the analysis process at a point in time at which the gas chromatograph 1 is changed to the maintenance switch mode. Further, the column oven 4 heats the separation column 3b as well as the separation column 3a during the analysis process using the first analysis line. Therefore, at a point in time at which the gas chromatograph 1 is changed to the maintenance switch mode, the temperature of the separation column 3b is adjusted to a temperature suitable for the analysis process. In this state, the controller 10 starts the analysis process using the second analysis line.

The operator is notified that the gas chromatograph 1 is changed to the maintenance switch mode by checking a liquid crystal screen of the main body of the device or the like. Alternatively, the operator is notified that the gas chromatograph 1 is changed to the maintenance switch mode by receiving an email or checking blinking of the indicator 77a. The operator can identify that the sample vaporization unit 2a out of the two sample vaporization units 2a, 2b can be maintained by checking blinking of the indicator 77a provided sidewardly of the sample vaporization unit 2a. The operator removes a lid of the sample vaporization unit 2a and takes out the components to be maintained such as the glass insert 21a, the septum 22a or the like in the sample vaporization unit 2a. Because the pressure of the carrier gas supplied to the sample vaporization unit 2a is lowered to about an atmospheric pressure then, the gas in the sample vaporization unit 2a does not blow out even when the operator removes the lid of the sample vaporization unit 2a to release the inner gas. As described above, in the maintenance switch mode, the supply pressure of the carrier gas with respect to the sample vaporization unit 2a is lowered to 30 kPa, for example.

Further, because the temperature of the sample vaporization unit 2a is lowered, there is no problem with maintenance work for the sample vaporization unit 2a to be carried out by the operator. As described above, in the maintenance switch mode, the temperature of the sample vaporization unit 2a is lowered to 50° C., for example.

When maintenance such as cleaning of the components such as the glass insert 21a and the septum 22a ends, the operator attaches the components that have been maintained to the sample vaporization unit 2a. Alternatively, in a case where the components such as the glass insert 21a and the septum 22a need to be replaced, the operator attaches new components to the sample vaporization unit 2a. Further, the operator attaches the lid to the sample vaporization unit 2a and makes the sample vaporization unit 2a be able to behave.

In the maintenance switch mode, because this gas chromatograph 1 lowers the supply pressure of the carrier gas supplied to the sample vaporization unit 2a, the pressure of gas in the sample vaporization unit 2a is lowered. Thus, the components in the sample vaporization unit 2a can be maintained. Further, because the supply pressure of the auxiliary gas is set higher than the supply pressure of the carrier gas by an increase of the supply pressure of the auxiliary gas supplied from the auxiliary gas supplier 62a, the auxiliary gas flows into the separation column 3a instead of the carrier gas. Thus, the maintenance switch mode can be set while the column oven 4 continues to be heated. Because the column oven 4 continues to be heated in the maintenance switch mode, the analysis process using the second analysis line including the sample vaporization unit 2b, the separation column 3b and the detector 5b can be started immediately. Thus, even in a case where it is for the sample vaporization unit 2a to be maintained, the gas chromatograph 1 can continue the analysis process without interruption.

In the above-mentioned embodiment, when the gas chromatograph 1 is changed to the maintenance switch mode, the controller 10 controls the heaters 71a, 71b and lowers the temperatures of the sample vaporization units 2a, 2b. Thus, the operator can manually carry out maintenance work for the glass inserts 21a, 21b and the septums 22a, 22b. In another embodiment, the controller 10 may change the gas chromatograph 1 to the maintenance switch mode without lowering the temperatures of the sample vaporization units 2a, 2b. In this case, because the temperatures of the sample vaporization units 2a, 2b are high similarly to the temperatures during the analysis, maintenance work is carried out by a robot.

(5) One Example of Method of Setting Maintenance Switch Mode

Figure 4:
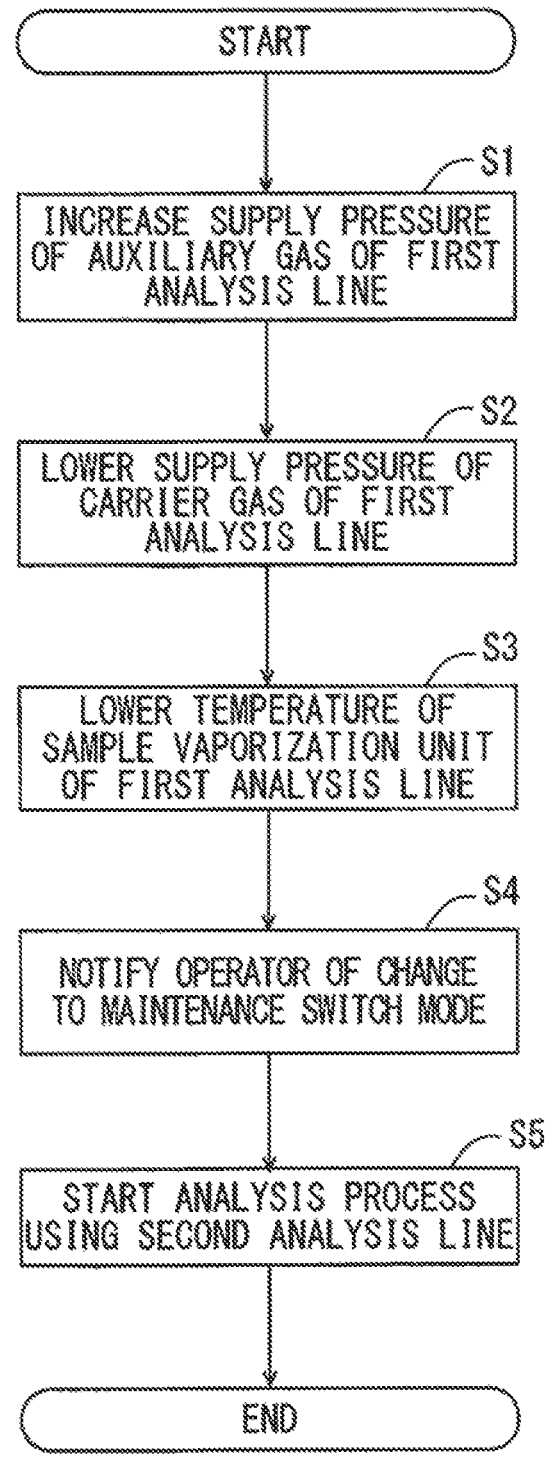
FIG. 4 is a diagram showing a method of setting the maintenance switch mode.

FIG. 4 is a flowchart showing a method of setting the maintenance switch mode. The method of setting the maintenance switch mode in FIG. 4 is performed by execution of a maintenance switch mode setting program P1 stored in the storage device 104 or the ROM 103 by the CPU 101 of FIG. 2. In the present embodiment, the controller 10 manages the time for maintenance for the components such as the glass inserts 21a, 21b and the septums 22a, 22b in the sample vaporization units 2a, 2b and automatically performs the method of setting the maintenance switch mode shown in FIG. 4 at a point in time at which it is time for maintenance. Alternatively, when the operator manually provides an instruction for changing the gas chromatograph 1 to the maintenance switch mode, the controller 10 performs the method of setting the maintenance switch mode.

The method of setting the maintenance switch mode in FIG. 4 is performed when the sample vaporization unit 2a of the first analysis line needs to be maintained during the analysis process using the first analysis line, by way of example. The same applies to a flow of a process in a case where the sample vaporization unit 2b of the second analysis line needs to be maintained during the analysis process using the second analysis line.

When it is time for the sample vaporization unit 2a to be maintained, and the method of setting the maintenance switch mode is started to be performed, the controller 10 first controls the auxiliary gas supplier 62a and increases the supply pressure of an auxiliary gas (step S1). Subsequently, the controller 10 controls the carrier gas supplier 61a and lowers the supply pressure of a carrier gas (step S2). At this time, the supply pressure of an auxiliary gas is set higher than the supply pressure of the carrier gas as described above. The step S1 and the step S2 may be performed at the same time.

Subsequently, the controller 10 controls the heater 71a and lowers the temperature of the sample vaporization unit 2a (step S3). Next, the controller 10 notifies the operator that the gas chromatograph 1 has been changed to the maintenance switch mode. The controller 10 notifies the operator of the change to the maintenance switch mode using the liquid crystal screen of the main body of the device or the like. Alternatively, the controller 10 starts the email program P2, sends an email to the operator and notifies the operator of the change to the maintenance switch mode. Alternatively, the controller 10 causes the indicator 77a provided sidewardly of the sample vaporization unit 2a to blink and notifies the operator of the change to the maintenance switch mode (step S4). Subsequently, the controller 10 starts an analysis process using the second analysis line (step S5). A sample drops from the microsyringe 9 into the sample vaporization unit 2b, and the analysis process using the separation column 3b and the detector 5b is started.

In the above-mentioned description, the gas chromatograph 1 is changed to the maintenance switch mode, and an analysis line is switched from the first analysis line to the second analysis line when it is time for the sample vaporization unit 2a of the first analysis line to be maintained, by way of example. Similarly, also when it is time for the sample vaporization unit 2b of the second analysis line to be maintained, the gas chromatograph 1 is changed to the maintenance switch mode, and the analysis line is switched from the second analysis line to the first analysis line.

In the above-mentioned embodiment, when it is time for the components of the sample vaporization unit 2a to be maintained, the controller 10 automatically changes the gas chromatograph 1 to the maintenance switch mode. The operator is not required to move to the location at which the gas chromatograph 1 is installed or perform an operation of changing the gas chromatograph 1 to the maintenance switch mode in order to change the gas chromatograph 1 to the maintenance switch mode. The controller 10 may determine the time when each component such as the glass insert 21a or the septum 22a is to be maintained from the execution count of the analysis process executed by the gas chromatograph 1. Further, the controller 10 sets the sample vaporization unit 2a in a maintainable state and continues the analysis process utilizing the second analysis line. Thus, even in a case where it is time for the sample vaporization units 2a, 2b to be maintained, the controller 10 can continue the analysis process without interruption while switching between the first analysis line and the second analysis line.

In the above-mentioned embodiment, the controller 10 informs the operator of the change to the maintenance switch mode by utilizing the screen of the main body of the device, the email program P2 or the indicators 77a, 77b. The operator can carry out maintenance work in response to this notification. The operator can start maintenance work without providing a change instruction or performing change work for changing the gas chromatograph 1 to the maintenance switch mode.

(6) Modified Example of First Embodiment

In the above-mentioned embodiment, the auxiliary gas suppliers 62a, 62b are provided to supply an auxiliary gas to positions farther downstream than the separation columns 3a, 3b. These auxiliary gas suppliers 62a, 62b may serve as gas suppliers for backflash.

In the above-mentioned embodiment, the auxiliary gas suppliers 62a, 62b are provided to supply an auxiliary gas to positions farther downstream than the separation columns 3a, 3b. Further, the auxiliary gas suppliers 62a, 62b are configured to supply an auxiliary gas to a gas flow path between the separation column 3a and the detectors 5a and a flow path between the separation column 3b and the detector 5b, respectively. In a modified example, the auxiliary gas suppliers 62a, 62b may be configured to supply an auxiliary gas to the detectors 5a, 5b, respectively. In this case, auxiliary resistor tubes may be provided in the detectors 5a, 5b, respectively. In a case where an auxiliary gas is supplied into the detectors 5a, 5b, a makeup gas supplier can be utilized.

[2] Second Embodiment (1) Overall Configuration of Gas Chromatograph

Figure 5:
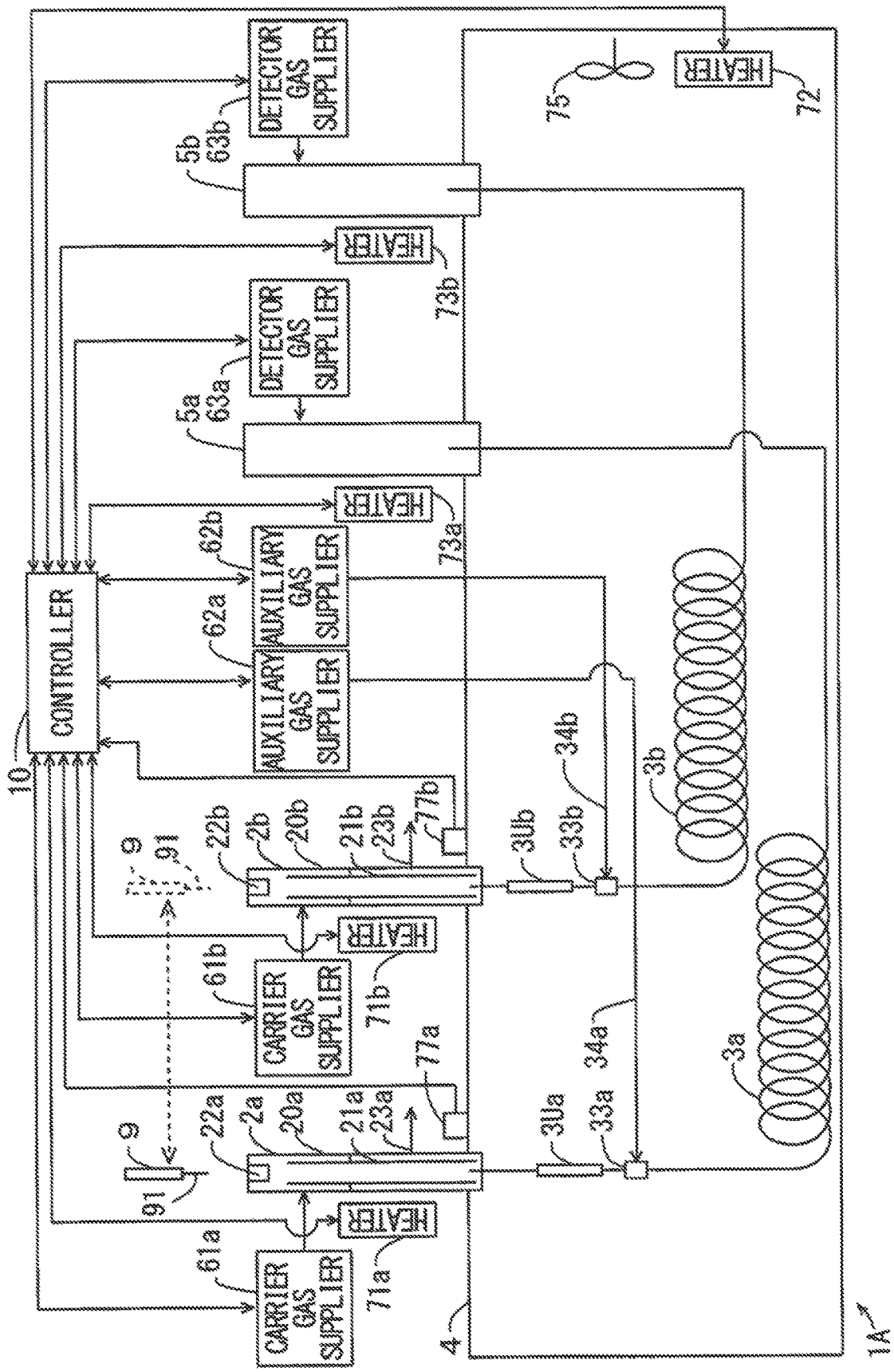
FIG. 5 is an overview showing a gas chromatograph according to a second embodiment.

A second embodiment of the present invention will be described next. FIG. 5 is an overview of a gas chromatograph 1A according to the second embodiment. In the gas chromatograph 1A according to the second embodiment, the positions of auxiliary resistor tubes and branch elements are different from those in the gas chromatograph 1 according to the first embodiment. In the gas chromatograph 1A, the auxiliary resistor tubes 3Ua, 3Ub are arranged at positions farther upstream than separation columns 3a, 3b, respectively. Further, at the respective positions farther upstream than the respective separation columns 3a, 3b, the branch elements 33a, 33b are arranged at a position between the auxiliary resistor tube 3Ua and the separation column 3a and a position between the auxiliary resistor tube 3Ub and the separation column 3b, respectively. Further, an auxiliary gas supplied from each of auxiliary gas suppliers 62a, 62b is supplied to each of the branch elements 33a, 33b through each of auxiliary gas paths 34a, 34b. Because being similar to the gas chromatograph 1 according to the first embodiment, the rest of the configuration of the gas chromatograph 1A will not be described.

(2) Maintenance Switch Mode

The states of the gas chromatograph 1A during an analysis and in a maintenance switch mode in a case where a sample vaporization unit 2a of a first analysis line needs to be maintained will be described next, by way of example. The same applies to a case where a sample vaporization unit 2b of a second analysis line needs to be maintained.

As shown in FIG. 6A, the supply pressure of a carrier gas applied by a carrier gas supplier 61a is PA3 (Pa) during an analysis. The supply pressure of an auxiliary gas applied by an auxiliary gas supplier 62a is PB3 (Pa). Similarly to the first embodiment, the controller 10 sets the supply pressure of the carrier gas higher than the supply pressure of the auxiliary gas during an analysis process (PA3>PB3). For example, the controller 10 sets the supply pressure PA of the carrier gas to 100 kPa and sets the supply pressure PB3 of the auxiliary gas to 30 kPa.

The arrow F3 in FIG. 6A indicates the direction in which gas flows. The carrier gas supplied from the carrier gas supplier 61a flows from the sample vaporization unit 2a toward the separation column 3a. The carrier gas that flows toward the separation column 3a further flows downstream and is sent into the detector 5a. Part of the carrier gas supplied from the carrier gas supplier 61a is exhausted from the split path 23a. The auxiliary gas supplied from the auxiliary gas supplier 62a is sent into the detector 5a together with the carrier gas due to the pressure of the carrier gas.

As shown in FIG. 6A, during an analysis, the temperature of the sample vaporization unit 2a is set to TA3 (° C.), the temperature of the detector 5a is set to TB3 (° C.) and the temperature of the column oven 4 is set to TC3 (° C.). Similarly to the first embodiment, the controller 10 sets the temperature of the sample vaporization unit 2a to 300° C., sets the temperature of the detector 5a to 350° C. and sets the temperature of the column oven 4 to 250° C., for example. In the above-mentioned state, the gas chromatograph 1A separates a sample supplied from the sample vaporization unit 2a in the separation column 3a, and the detector 5a detects each sample component obtained by separation in the separation column 3a.

As shown in FIG. 6B, in the maintenance switch mode, the supply pressure of the carrier gas applied by the carrier gas supplier 61a is PA4 (Pa). The controller 10 lowers the supply pressure PA4 of the carrier gas to a pressure lower than the supply pressure PA3 during the analysis (PA3>PA4). The supply pressure of the auxiliary gas applied by the auxiliary gas supplier 62a is PB4 (Pa). The controller 10 increases the supply pressure PB4 of the auxiliary gas to a pressure higher than the supply pressure PB3 during the analysis (PB3<PB4). For example, the controller 10 sets the supply pressure PA4 of the carrier gas to 0 kPa to 30 kPa and sets the supply pressure PB4 of the auxiliary gas to 100 kPa. However, this pressure setting is one example. The controller 10 may lower the pressure of the carrier gas to a degree to which the components of the sample vaporization unit 2a can be maintained. Further, the controller 10 can increase the pressure of the auxiliary gas to a degree to which air does not enter the separation column 3a. In this manner, in the maintenance switch mode, the controller 10 sets the supply pressure PB4 of the auxiliary gas higher than the supply pressure PA4 of the carrier gas (PA4<PB4).

The arrow F4 in FIG. 6B indicates the direction in which gas flows. The carrier gas supplied from the carrier gas supplier 61a is exhausted from the split path 23a. The auxiliary gas supplied from the auxiliary gas supplier 62a flows into the separation column 3a and the auxiliary resistor tube 3Ua in accordance with the ratio of channel resistance between the separation column 3a and the auxiliary resistor tube 3Ua. The auxiliary gas that flows into the separation column 3a further flows downstream and is sent into the detector 5a. The auxiliary gas that has flowed into the auxiliary resistor tube 3Ua flows into the sample vaporization unit 2a and is exhausted from the split path 23a.

As shown in FIG. 6B, during the analysis, the temperature of the sample vaporization unit 2a is set to TA4 (° C.), the temperature of the detector 5a is set to TB4 (° C.) and the temperature of the column oven 4 is set to TC4 (° C.). In the maintenance switch mode, the controller 10 controls a heater 71a and lowers the temperature of the sample vaporization unit 2a (TA3>TA4). The controller 10 sets the temperature of the sample vaporization unit 2a to 50° C., for example. However, this temperature is one example. The controller 10 may lower the temperature of the sample vaporization unit 2a to a degree to which the operator can manually carry out maintenance work.

The controller 10 keeps the temperatures of the detector 5a and the column oven 4 at the same temperatures as the temperatures during the analysis (TB3=TB4, TC3=TC4). That is, in the above-mentioned example, the temperature of the detector 5 is kept at 350° C., and the temperature of the column oven 4 is kept at 250° C. However, these temperatures are examples. The controller 10 may keep the temperature of the detector 5a at the same temperature as the temperature during the analysis or may lower the temperature of the detector 5a to a temperature slightly lower than the temperature during the analysis. Since the switch to the second analysis line is carried out in the gas chromatograph 1A, the controller 10 keeps the temperature of the column oven 4 at the temperature required for the analysis process using the second analysis line. A heater 72 continues to heat the column oven 4, so that the analysis process using the second analysis line can continue even after the gas chromatograph 1A is changed to the maintenance switch mode. In the above-mentioned state, the gas chromatograph 1A is changed to the maintenance switch mode.

The same behavior as the first embodiment applies to the behavior after the change to the maintenance switch mode. The controller 10 notifies the operator of the change to the maintenance switch mode using the liquid crystal screen of the main body of the device or the like. Alternatively, the controller 10 notifies the operator of the change to the maintenance switch mode by an email, the indicator 77a or the like. The operator maintains the components to be maintained such as a glass insert 21a, a septum 22a or the like of the sample vaporization unit 2a. Because the pressure of the carrier gas supplied to the sample vaporization unit 2a is lowered to about an atmospheric pressure then, the gas in the sample vaporization unit 2a does not blow out even when the operator removes the lid of the sample vaporization unit 2a to release the inner gas. Further, because the temperature of the sample vaporization unit 2a is lowered, there is no problem with maintenance work for the sample vaporization unit 2a to be carried out by the operator.

The controller 10 notifies the operator of the maintenance switch mode and starts the analysis process using the second analysis line. The control of start of the analysis process using the second analysis line is similar to that of the first embodiment. That is, when the gas chromatograph 1A is changed to the maintenance switch mode, the controller 10 adjusts the supply pressures of the carrier gas and the auxiliary gas in the second analysis line to the supply pressure at which the analysis process can be executed. Further, the sample vaporization unit 2b and the detector 5b are kept at temperatures at which the analysis process can be executed also during the analysis process using the first analysis line. Therefore, the temperatures of the sample vaporization unit 2b and the detector 5b are adjusted to the temperatures suitable for the analysis process at a point in time at which the gas chromatograph 1 is changed to the maintenance switch mode. Further, the column oven 4 heats the separation column 3b as well as the separation column 3a during the analysis process using the first analysis line. Therefore, at a point in time at which the gas chromatograph 1 is changed to the maintenance switch mode, the temperature of the separation column 3b is adjusted to a temperature suitable for the analysis process. In this state, the controller 10 can start the analysis process using the second analysis line without requiring a waiting time.

In the above-mentioned description, the gas chromatograph 1A is changed to the maintenance switch mode, and the analysis line is changed from the first analysis line to the second analysis line when it is time for the sample vaporization unit 2a of the first analysis line to be maintained, by way of example. Similarly, also when it is time for the sample vaporization unit 2b of the second analysis line to be maintained, the gas chromatograph 1 is changed to the maintenance switch mode, and the analysis line is switched from the second analysis line to the first analysis line.

Also in the second embodiment, when the gas chromatograph 1A is changed to the maintenance switch mode, the controller 10 controls the heaters 71a, 71b and lowers the temperatures of the sample vaporization units 2a, 2b. Thus, the operator can manually carry out maintenance work for the glass inserts 21a, 21b and the septums 22a, 22b. In another embodiment, the controller 10 may change the gas chromatograph 1 to the maintenance switch mode without lowering the temperatures of the sample vaporization units 2a, 2b. In this case, because the temperatures of the sample vaporization units 2a, 2b are high similarly to the temperatures during the analysis, maintenance work is carried out by a robot.

3 Third Embodiment

Figure 7:
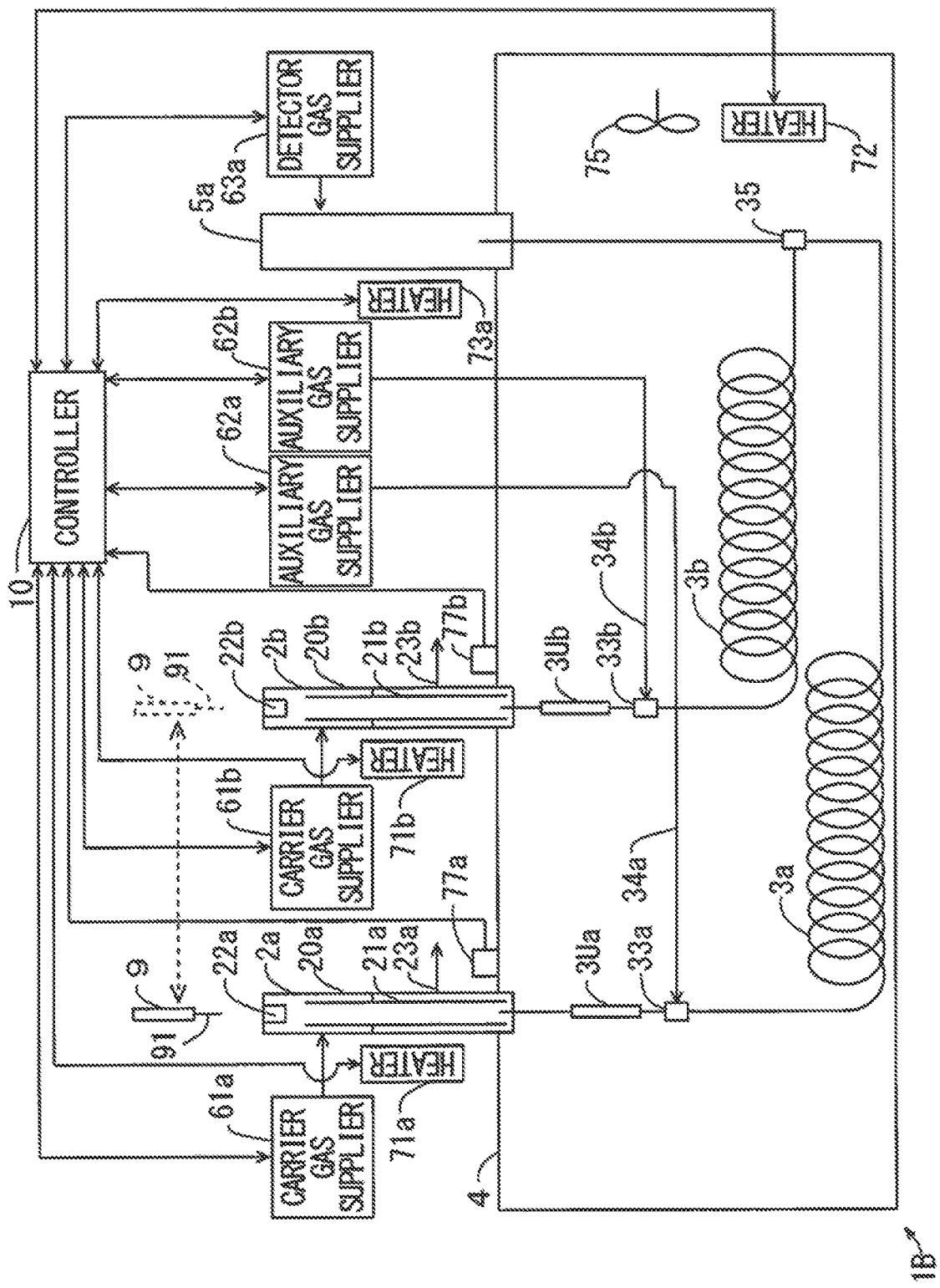
FIG. 7 is an overview showing a gas chromatograph according to a third embodiment.

A third embodiment of the present invention will be described next. FIG. 7 is an overview of a gas chromatograph 1B according to the third embodiment. In the gas chromatograph 1B according to the third embodiment, the arrangement of a detector is different from the detectors in the gas chromatograph 1A according to the second embodiment. In the second embodiment, the detectors 5a, 5b are connected to the first analysis line and the second analysis line, respectively. In the third embodiment, a first analysis line and a second analysis line share one detector 5a. A branch element 35 is provided at a position farther downstream than separation columns 3a, 3b. The first analysis line and the second analysis line join each other in the branch element 35. The common detector 5a is connected to a position farther downstream than the branch element 35. Because being similar to the gas chromatograph 1A according to the second embodiment, the configuration of the rest of the gas chromatograph 1B will not be described.

The states of the gas chromatograph 1B during an analysis and in a maintenance switch mode are similar to those in the second embodiment described with reference to FIGS. 6A and 6B. When it is time for sample vaporization units 2a, 2b to be maintained, the gas chromatograph 1B can continue an analysis process while switching between the first analysis line and the second analysis line.

[4] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the sample vaporization unit 2a is an example of a first sample vaporization unit, and the sample vaporization unit 2b is an example of a second vaporization unit. Further, the separation column 3a is an example of a first separation column, and the separation column 3b is an example of a second separation column. The carrier gas supplier 61a is an example of a first carrier gas supplier, and the carrier gas supplier 61b is an example of a second carrier gas supplier. The detector 5a is an example of a first detector, and the detector 5b is an example of a second detector. The auxiliary gas supplier 62a is an example of a first auxiliary gas supplier, and the auxiliary gas supplier 62b is an example of a second auxiliary gas supplier. The heater 72 is an example of a first heater, the heater 71a is an example of a second heater and the heater 71b is an example of a third heater. Further, the email program P2 and the indicators 77a, 77b are examples of a notifier.

As each of constituent elements recited in the claims, various other elements having configurations or functions described in the claims can be also used.

[5] Other Embodiments

A sample may be supplied to the gas chromatographs 1, 1A, 1B of the above-mentioned embodiments with the use of an autosampler. In this case, the controller 10 may switch the destination to which a sample is supplied by the autosampler at the time of a change to the maintenance switch mode. While the sample vaporization units 2a, 2b are configured to include the glass inserts 21a, 21b in the above-mentioned embodiments, the present invention can be applied even in a case where the sample vaporization units 2a, 2b are not configured to include the glass inserts 21a, 21b.

In the above-mentioned embodiment, the gas chromatographs 1, 1A, 1B respectively include the first analysis line and the second analysis line. Further, when it is time the sample vaporization units 2a, 2b to be maintained, the gas chromatographs 1, 1A, 1B can continue the analysis process while switching the analysis lines having the two systems. Additionally, the present invention can be applied to a gas chromatograph having an analysis line that includes three or more systems. Even in a case where the analysis line having three or more systems is included, when it is time for a sample vaporization unit to be maintained, it is possible to continue an analysis process without interruption while switching these analysis lines.

The invention claimed is:
1. A gas chromatograph comprising:
    a first sample vaporization unit that vaporizes a sample;
    a second sample vaporization unit that vaporizes a sample;
    a first separation column that separates a sample supplied from the first sample vaporization unit into respective sample components;
    a second separation column that separates a sample supplied from the second sample vaporization unit into respective sample components;
    a first carrier gas supplier that supplies a carrier gas, for guiding a sample that is vaporized in the first sample vaporization unit to the first separation column, to the first sample vaporization unit;
    a second carrier gas supplier that supplies a carrier gas, for guiding a sample that is vaporized in the second sample vaporization unit to the second separation column, to the second sample vaporization unit;

a column oven that contains the first and second separation columns and has a first heater for heating the first and second separation columns;

a first detector that detects respective sample components obtained by separation in the first separation column;

a second detector that detects respective sample components obtained by separation in the second separation column;

a first auxiliary gas supplier that supplies an auxiliary gas to the first separation column; and a controller that executes control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and sets a first maintenance switch mode in which the first sample vaporization unit is maintainable with the first heater continuing to heat the first and second separation columns and supplies a sample supplied from the second sample vaporization unit to the second separation column as well as setting the first maintenance switch mode to continue an analysis process.

2. The gas chromatograph according to claim 1, further comprising a second heater for heating the first sample vaporization unit, wherein
the controller controls the second heater and lowers a temperature of the first sample vaporization unit in the first maintenance switch mode.

3. The gas chromatograph according to claim 1, wherein the first auxiliary gas supplier is provided at a position farther downstream than the first separation column.

4. The gas chromatograph according to claim 1, wherein the first auxiliary gas supplier is provided at a position farther upstream than the first separation column.

5. The gas chromatograph according to claim 1, wherein the controller determines necessity of maintenance for the first sample vaporization unit, and changes the gas chromatograph to the first maintenance switch mode in a case where maintenance is necessary.

6. The gas chromatograph according to claim 1, wherein the controller includes a notifier that notifies an operator of a change to the first maintenance switch mode when the first maintenance switch mode is set.

7. The gas chromatograph according to claim 1, further comprising a second auxiliary gas supplier that supplies an auxiliary gas to the second separation column, wherein
the controller executes control by increasing a supply pressure of an auxiliary gas applied by the second auxiliary gas supplier to a pressure higher than a pressure during an analysis of a sample supplied from the second sample vaporization unit and lowering a supply pressure of a carrier gas applied by the second carrier gas supplier to a pressure lower than a pressure during the analysis of the sample supplied from the second sample vaporization unit such that the supply pressure of the auxiliary gas is higher than the supply pressure of the carrier gas, and sets a second maintenance switch mode in which the second sample vaporization unit is maintainable with the first heater continuing to heat the first and second separation columns and supplies a sample supplied from the first sample vaporization unit to the first separation column as well as setting the second maintenance switch mode to continue an analysis process.

8. The gas chromatograph according to claim 7, further comprising a third heater for heating the second sample vaporization unit, wherein
the controller controls the third heater and lowers a temperature of the second sample vaporization unit in the second maintenance switch mode.

9. The gas chromatograph according to claim 7, wherein the second auxiliary gas supplier is provided at a position farther downstream than the second separation column.

10. The gas chromatograph according to claim 7, wherein the second auxiliary gas supplier is provided at a position farther upstream than the second separation column.

11. A gas chromatograph comprising:
a first sample vaporization unit that vaporizes a sample;
a second sample vaporization unit that vaporizes a sample;
a first separation column that separates a sample supplied from the first sample vaporization unit into respective sample components;
a second separation column that separates a sample supplied from the second sample vaporization unit into respective sample components;
a first carrier gas supplier that supplies a carrier gas, for guiding a sample that is vaporized in the first sample vaporization unit to the first separation column, to the first sample vaporization unit;
a second carrier gas supplier that supplies a carrier gas, for guiding a sample that is vaporized in the second sample vaporization unit to the second separation column, to the second sample vaporization unit;
a column oven that contains the first and second separation columns and has a first heater for heating the first and second separation columns;
a detector that detects respective sample components obtained by separation in the first separation column or respective sample components obtained by separation in the second separation column;
a first auxiliary gas supplier that supplies an auxiliary gas to the first separation column; and
a controller that executes control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas, and keeps the detector in a state in which a detection process is executable, sets a first maintenance switch mode in which the first sample vaporization unit is maintainable with the first heater continuing to heat the first and second separation columns and supplies a sample supplied from the second sample vaporization unit to the second separation column as well as setting the first maintenance switch mode to continue an analysis process.

12. The gas chromatograph according to claim 11, further comprising a second auxiliary gas supplier that supplies an auxiliary gas to the second separation column, wherein
the controller executes control by increasing a supply pressure of an auxiliary gas applied by the second auxiliary gas supplier to a pressure higher than a pressure during an analysis of a sample supplied from the second sample vaporization unit and lowering a supply pressure of a carrier gas applied by the second carrier gas supplier to a pressure lower than a pressure during the analysis of the sample supplied from the second sample vaporization unit such that the supply pressure of the auxiliary gas is higher than the supply pressure of the carrier gas, and keeps the detector in a state in which a detection process is executable, sets a second maintenance switch mode in which the second sample vaporization unit is maintainable with the first heater continuing to heat the first and second separation columns and supplies a sample supplied from the first sample vaporization unit to the first separation column as well as setting the second maintenance switch mode to continue an analysis process.

13. A maintenance switch mode setting method for setting a gas chromatograph in a maintenance switch mode,
the gas chromatograph comprising:
a first sample vaporization unit that vaporizes a sample;
a second sample vaporization unit that vaporizes a sample;
a first separation column that separates a sample supplied from the first sample vaporization unit into respective sample components;
a second separation column that separates a sample supplied from the second sample vaporization unit into respective sample components;
a first carrier gas supplier that supplies a carrier gas, for guiding a sample that is vaporized in the first sample vaporization unit to the first separation column, to the first sample vaporization unit;
a second carrier gas supplier that supplies a carrier gas, for guiding a sample that is vaporized in the second sample vaporization unit to the second separation column, to the second sample vaporization unit;
a column oven that contains the first and second separation columns and has a first heater for heating the first and second separation columns;
a first detector that detects respective sample components obtained by separation in the first separation column;
a second detector that detects respective sample components obtained by separation in the second separation column; and
a first auxiliary gas supplier that supplies an auxiliary gas to the first separation column, and
the maintenance switch mode setting method including:
executing control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas; and
setting the gas chromatograph in a state in which the first sample vaporization unit is maintainable with the first heater continuing to heat the first and second separation columns and supplying a sample supplied from the second sample vaporization unit to the second separation column to start an analysis process.

14. A maintenance switch mode setting method for setting a gas chromatograph in a maintenance switch mode,
the gas chromatograph comprising:
a first sample vaporization unit that vaporizes a sample;
a second sample vaporization unit that vaporizes a sample;
a first separation column that separates a sample supplied from the first sample vaporization unit into respective sample components;
a second separation column that separates a sample supplied from the second sample vaporization unit into respective sample components;
a first carrier gas supplier that supplies a carrier gas, for guiding a sample that is vaporized in the first sample vaporization unit to the first separation column, to the first sample vaporization unit;
a second carrier gas supplier that supplies a carrier gas, for guiding a sample that is vaporized in the second sample vaporization unit to the second separation column, to the second sample vaporization unit;
a column oven that contains the first and second separation columns and has a first heater for heating the first and second separation columns;
a detector that detects respective sample components obtained by separation in the first separation column or respective sample components obtained by separation in the second separation column; and
a first auxiliary gas supplier that supplies an auxiliary gas to the first separation column, and
the maintenance switch mode setting method including:
executing control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas; and
keeping the detector in a state in which a detection process is executable, setting the gas chromatograph in a state in which the first sample vaporization unit is maintainable with the first heater continuing to heat the first and second separation columns and supplying a sample supplied from the second sample vaporization unit to the second separation column to start an analysis process.

15. A non-transitory computer readable medium storing a maintenance switch mode setting program for setting a gas chromatograph in a maintenance switch mode,
the gas chromatograph comprising:
a first sample vaporization unit that vaporizes a sample;
a second sample vaporization unit that vaporizes a sample;
a first separation column that separates a sample supplied from the first sample vaporization unit into respective sample components;
a second separation column that separates a sample supplied from the second sample vaporization unit into respective sample components;
a first carrier gas supplier that supplies a carrier gas, for guiding a sample that is vaporized in the first sample vaporization unit to the first separation column, to the first sample vaporization unit;

a second carrier gas supplier that supplies a carrier gas, for guiding a sample that is vaporized in the second sample vaporization unit to the second separation column, to the second sample vaporization unit;

a column oven that contains the first and second separation columns and has a first heater for heating the first and second separation columns;

a first detector that detects respective sample components obtained by separation in the first separation column;

a second detector that detects respective sample components obtained by separation in the second separation column; and a first auxiliary gas supplier that supplies an auxiliary gas to the first separation column, and the maintenance switch mode setting program causing a computer to:

execute control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas; and set the gas chromatograph in a state in which the first sample vaporization unit is maintainable with the first heater continuing to heat the first and second separation columns and supply a sample supplied from the second sample vaporization unit to the second separation column to start an analysis process.

16. A non-transitory computer readable medium storing a maintenance switch mode setting program for setting a gas chromatograph in a maintenance switch mode, the gas chromatograph comprising:

a first sample vaporization unit that vaporizes a sample;

a second sample vaporization unit that vaporizes a sample;

a first separation column that separates a sample supplied from the first sample vaporization unit into respective sample components;

a second separation column that separates a sample supplied from the second sample vaporization unit into respective sample components;

a first carrier gas supplier that supplies a carrier gas, for guiding a sample that is vaporized in the first sample vaporization unit to the first separation column, to the first sample vaporization unit;

a second carrier gas supplier that supplies a carrier gas, for guiding a sample that is vaporized in the second sample vaporization unit to the second separation column, to the second sample vaporization unit;

a column oven that contains the first and second separation columns and has a first heater for heating the first and second separation columns;

a detector that detects respective sample components obtained by separation in the first separation column or respective sample components obtained by separation in the second separation column; and a first auxiliary gas supplier that supplies an auxiliary gas to the first separation column, and the maintenance switch mode setting program causing a computer to:

execute control by increasing a supply pressure of an auxiliary gas applied by the first auxiliary gas supplier to a pressure higher than a pressure during an analysis of a sample supplied from the first sample vaporization unit and lowering a supply pressure of a carrier gas applied by the first carrier gas supplier to a pressure lower than a pressure during the analysis of the sample supplied from the first sample vaporization unit such that the supply pressure of the auxiliary gas is higher than the supply pressure of the carrier gas; and keep the detector in a state in which a detection process is executable, set the gas chromatograph in a state in which the first sample vaporization unit is maintainable with the first heater continuing to heat the first and second separation columns and supply a sample supplied from the second sample vaporization unit to the second separation column to start an analysis process.

\* \* \* \* \*